US010464596B2

(12) United States Patent
Hwang et al.

(10) Patent No.: US 10,464,596 B2
(45) Date of Patent: Nov. 5, 2019

(54) STEERING SYSTEM FOR VEHICLE AND METHOD OF CONTROLLING SAME

(71) Applicants: Hyundai Motor Company, Seoul (KR); Kia Motors Corporation, Seoul (KR)

(72) Inventors: Sang Woo Hwang, Seoul (KR); Hyeon Seok Cho, Pyeongtaek-si (KR); Byung Rim Lee, Seongnam-si (KR); Young Dae Park, Asan-si (KR); Min Jun Kim, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 149 days.

(21) Appl. No.: 15/811,343

(22) Filed: Nov. 13, 2017

(65) Prior Publication Data

US 2019/0002015 A1   Jan. 3, 2019

(30) Foreign Application Priority Data

Jun. 28, 2017  (KR) .......................... 10-2017-0081611

(51) Int. Cl.
*B62D 5/04* (2006.01)
*B62D 3/12* (2006.01)

(52) U.S. Cl.
CPC .............. *B62D 5/0463* (2013.01); *B62D 3/12* (2013.01); *B62D 5/0421* (2013.01); *B62D 5/0481* (2013.01)

(58) Field of Classification Search
CPC .................................................. B62D 15/0225
See application file for complete search history.

(56) References Cited

U.S. PATENT DOCUMENTS

| | | | | |
|---|---|---|---|---|
| 6,929,090 B2* | 8/2005 | Furumi | ................... | B62D 5/04 180/446 |
| 7,900,742 B2* | 3/2011 | Kubokawa | ............. | B62D 1/163 180/402 |
| 8,862,328 B2* | 10/2014 | Gebregergis | ......... | B62D 5/0418 180/443 |
| 9,106,175 B2* | 8/2015 | Fisher | ................. | H02P 29/0241 |

(Continued)

FOREIGN PATENT DOCUMENTS

KR   10-2017-0043169 A   4/2017

*Primary Examiner* — Joseph M Rocca
*Assistant Examiner* — Harold Eric Pahlck, III
(74) *Attorney, Agent, or Firm* — Morgan, Lewis & Bockius LLP

(57) ABSTRACT

A steering system for a vehicle may include first and second steering motors providing torque; a rack bar to which torques of the first and second steering motor are simultaneously applied, and configured to change steering angles of wheels by being displaced by the rotation of the first and second steering motors; first and second motor position detectors detecting rotation angles of the first and second steering motors, respectively; and a controller deriving an absolute position of the rack bar based on a difference between the rotation angles of the first and second steering motors detected by the first and second motor position detectors, wherein an amount of displacement of the rack bar according to an amount of rotation of the first steering motor is different from an amount of displacement of the rack bar according to an amount of rotation of the second steering motor.

11 Claims, 3 Drawing Sheets

(56) References Cited

U.S. PATENT DOCUMENTS

| | | | | |
|---|---|---|---|---|
| 9,481,391 | B2* | 11/2016 | Tomizawa | B62D 5/0466 |
| 9,828,021 | B2* | 11/2017 | Ueno | B62D 5/0421 |
| 9,988,072 | B2* | 6/2018 | Matsuda | B62D 5/0433 |
| 2017/0138760 | A1* | 5/2017 | Olsen | G01B 21/22 |
| 2018/0208235 | A1* | 7/2018 | Miyashita | B62D 6/00 |
| 2019/0106147 | A1* | 4/2019 | Schreiner | H02P 29/0241 |

* cited by examiner

STEERING SYSTEM FOR VEHICLE AND METHOD OF CONTROLLING SAME

CROSS REFERENCE TO RELATED APPLICATION

The present application claims priority to Korean Patent Application No. 10-2017-0081611, filed Jun. 28, 2017, the entire contents of which is incorporated herein for all purposes by this reference.

BACKGROUND OF THE INVENTION

Field of the Invention

The present invention relates generally to a steering system for a vehicle. More particularly, the present invention relates to a steering system for a vehicle and a method of controlling the same, whereby displacement of a steering rack bar connected to wheels of the vehicle is calculated through a rotation angle sensor of a steering motor.

Description of Related Art

As well known in the art, a steer-by-wire system is a steering system for a vehicle whereby a mechanical linkage between a steering wheel and drive wheels of the vehicle can be eliminated. A rotation signal of a steering wheel is transmitted through an electronic control unit (ECU), and then based on the transmitted rotation signal, a steering motor connected to the drive wheels is operated to provide a displacement to a rack bar connected to the wheels, steering the vehicle.

In a conventional steer-by-wire system, the rack bar is displaced due to engagement of a pinion gear rotated by the steering motor and a rack gear provided on the rack bar. Accordingly, a pinion angle sensor (PAS), which is an absolute angle sensor that detects a rotation angle of the pinion gear, is used to determine a steering angle by determining an absolute position of the rack bar according to the rotation angle of the pinion gear. Here, the absolute angle sensor (i.e., the pinion angle sensor) is a sensor that can determine an absolute value of the rotation angle of the pinion gear even when a power source of the sensor is turned on again after being turned off by turning off of the vehicle ignition, which can detect a rotation angle of equal to or greater than 360 degrees.

However, when using only one pinion angle sensor as the absolute angle sensor, there is no comparison object that can determine whether there is an error in a rotation angle detected by one pinion angle sensor immediately after the vehicle ignition is turned on. Accordingly, there is a problem that failure diagnosis and failure safety measures may not be established. As a result, the steering system for the vehicle necessarily uses two pinion angle sensors, which may complicate the system and may increase expense for implementing the steering system.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a steering system for a vehicle and a method of controlling the same, in which a displacement of a steering rack bar connected to the front wheels of the vehicle is determined through a rotation angle detector of a steering motor, eliminating requirement of a separate absolute angle detector and improving accuracy and reliability of steering angle determination.

In various aspects of the present invention, there is provided a steering system for a vehicle, the system including: first and second steering motors providing torque; a rack bar to which torque of the first steering motor and a torque of the second steering motor are simultaneously applied, and configured to change steering angles of wheels by being displaced by the rotation of the first and second steering motors; first and second motor position detectors detecting rotation angles of the first and second steering motors, respectively; and a controller deriving an absolute position of the rack bar based on a difference between the rotation angles of the first and second steering motors detected by the first and second motor position detector wherein an amount of displacement of the rack bar according to an amount of rotation of the first steering motor is different from an amount of displacement of the rack bar according to an amount of rotation of the second steering motor.

In the exemplary embodiment of the present invention, each of the first and second motor position detectors may detect a relative rotation angle of a rotation shaft of each of the first and second steering motors, the relative rotation angle being in a range of 0 to 360 degree angles.

In the exemplary embodiment of the present invention, the controller may derive revolutions of each of the first and second steering motors until a difference between the relative rotation angles of the first and second steering motors occurs, and may derive a displacement of the rack bar based on the revolutions and the relative rotation angle of the first steering motor or derive a displacement of the rack bar based on the revolutions and the relative rotation angle of the second steering motor.

The system may further include: first and second motion conversion mechanisms converting a rotary motion of the first steering motor and a rotary motion of the second steering motor into horizontal linear motions of the rack bar, respectively.

In the exemplary embodiment of the present invention, the first motion conversion mechanism may include a first pinion gear connected to the rotation shaft of the first steering motor and a first rack gear portion provided on the rack bar and engaged with the first pinion gear, and may further include a pinion angle detector configured for detecting an absolute amount of rotation of the first pinion gear.

In the exemplary embodiment of the present invention, the controller may derive a displacement of the rack bar based on the absolute amount of rotation of the first pinion gear detected by the pinion angle detector, and may determine whether the pinion angle detector is defective by comparing a displacement of the rack bar derived based on the difference between the rotation angles of the first and second steering motors and the displacement of the rack bar derived based on the absolute amount of rotation of the first pinion gear.

In the exemplary embodiment of the present invention, the second motion conversion mechanism may include a second pinion gear connected to the rotation shaft of the second steering motor and a second rack gear portion provided on the rack bar and engaged with the second pinion gear, and a gear ratio between the first pinion gear and the first rack gear portion may be different from a gear ratio between the second pinion gear and the second rack gear portion.

In the exemplary embodiment of the present invention, the second motion conversion mechanism may be implemented as a ball-screw mechanism that converts the rotary motion of the second steering motor into the horizontal linear motion of the rack bar.

According to various aspects of the present invention, there is provided a method of controlling a steering system for a vehicle, the method including: detecting a rotation angle of each of first and second steering motors that are simultaneously connected to a rack bar changing steering angles of wheels, and deriving a difference between the rotation angles of the first and second steering motors to provide a displacement to the rack bar; deriving an absolute position of the rack bar based on the difference between the rotation angles of the first and second steering motors; comparing a first absolute position value of the rack bar derived from results of a pinion angle detector configured for detecting an absolute amount of rotation of a first pinion gear engaged with a first rack gear portion provided on the rack bar and connected to a rotation shaft of the first steering motor, and a second absolute position value of the rack bar derived based on the difference between the rotation angles of the first and second steering motors; and determining that the pinion angle detector is not defective when the first and second absolute position values are equal to each other, and determining that the pinion angle detector is defective when the first and second absolute position values are different from each other, wherein an amount of displacement of the rack bar according to an amount of rotation of the first steering motor is different from an amount of displacement of the rack bar according to an amount of rotation of the second steering motor.

In the exemplary embodiment of the present invention, the deriving of the difference between the rotation angles of the first and second steering motors may be performed by detecting a relative rotation angle of a rotation shaft of each of the first and second steering motors, the relative rotation angle being in a range of 0 to 360 degree angles, and deriving a difference between the relative rotation angles of the first and second steering motors.

In the exemplary embodiment of the present invention, the deriving of the absolute position of the rack bar may be performed by deriving revolutions of each of the first and second steering motors until a difference between the relative rotation angles of the first and second steering motors occurs, and deriving a displacement of the rack bar based on the revolutions and the relative rotation angle of the first steering motor or deriving a displacement of the rack bar based on the revolutions and the relative rotation angle of the second steering motor.

According to the steering system for a vehicle and the method of controlling the same, even when only one pinion angle detector for detecting an absolute amount of rotation is used, it is possible to efficiently determine whether the pinion angle detector is faulty. Thus, requirement of a separate pinion angle detector can be eliminated, simplifying a structure of the steering system and reducing manufacturing cost thereof.

According to the steering system for a vehicle and the method of controlling the same, since only one pinion angle detector for detecting the absolute amount of rotation can be used, the second steering motor that remains not connected to the pinion angle detector may use a ball-screw mechanism instead of a rack-pinion mechanism. Thus, it is possible to promote scalability of the technology.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
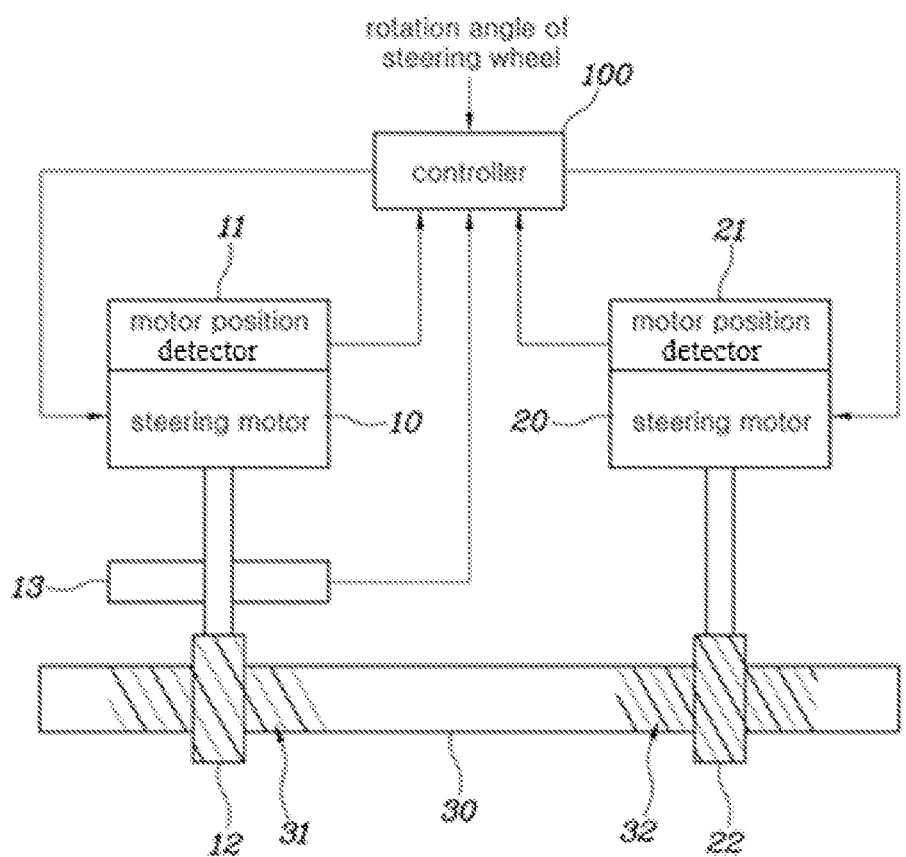
FIG. 1 is a block diagram showing a steering system for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, a steering system for a vehicle and a method of controlling the same according to exemplary embodiments of the present invention will be described more specifically with reference to the accompanying drawings. Throughout the drawings, the same reference numerals will refer to the same or like parts.

FIG. 1 is a block diagram showing a steering system for a vehicle according to an exemplary embodiment of the present invention.

Referring to FIG. 1, the steering system for a vehicle may include a first steering motor 1, a second steering motor 20, a rack bar 30, a first motor position detector 11, a second motor position detector 21, and a controller 100.

The first and second steering motors 10 and 20 provide torque such that the rack bar 30 is displaced in a horizontal direction thereof. Of course, both the first and second steering motors 10 and 20 may be operated by being physically simultaneously connected to the rack bar 30.

The rack bar 30 is connected at opposite end portions thereof to the wheels of the vehicle, and steering angles of the wheels may be determined by a horizontal linear motion of the rack bar 30. The rack bar 30 may be provided with first and second rack gear portions 31 and 32 having teeth. For example, first and second pinion gears 12 and 22 being rotated by the first steering motor 10 or the second steering motor 20 are engaged with the first and second rack gear portions 31 and 32 so that rotary motions of the first and second pinion gears 12 and 22 by the first and second steering motors 10 and 20 may be converted into the horizontal linear motions of the rack bar 30.

Accordingly, the steering system for a vehicle according to the exemplary embodiment of the present invention may further include a motion conversion mechanism including a rack-pinion mechanism implemented by the first and second pinion gears 12 and 22 and the first and second rack gear portions 31 and 32. Furthermore, a motion conversion mechanism including a ball-screw mechanism known in the art of the vehicle steering system may be employed other than the rack-pinion mechanism as occasion demands.

The first and the second motor position detectors 11 and 21 are detectors for detecting rotation angles of the first and second steering motors 10 and 20, respectively. For example, a Hall detector known in the art as a motor detector may be used. In general, such a Hall detector for detecting a rotation angle of a motor detects a change in a magnetic field according to rotation of a motor rotor to derive a position of the motor rotor. However, it detects only a relative position of the motor rotor, i.e., an angle of the motor rotor (rotation angle of the motor) in the range of 0 to 360 degree angles, without deriving an absolute amount of rotation of the motor.

Thus, when the vehicle ignition is turned on and electric power is supplied to the steering system, the number of revolutions of each of the first and second steering motors 10 and 20 is determined by the controller 100 according to signals detected by the first and second motor position detector 11 and 21, deriving an absolute amount of rotation of each motor. However, the controller 100 is also powered off when the vehicle ignition is turned off, so that when the vehicle ignition is turned on again, only relative rotation angles of the first and second steering motors 10 and 20 can be derived based on the signals detected by the first and second motor position detectors 11 and 21, respectively. Thus, an absolute position of the rack bar 30 according to rotation of the first and steering motors 10 and 20 cannot be derived.

Thus, to solve the problem that the absolute position of the rack bar 30 cannot be derived by only the rotation angles of the first and second steering motors 10 and 20 detected by the first and second motor position detectors 11 and 21, respectively, the steering system for a vehicle according to the exemplary embodiment of the present invention is configured such that an amount of displacement of the rack bar 30 according to an amount of rotation of the first steering motor 10 is different from an amount of displacement of the rack bar 30 according to an amount of rotation of the second steering motor 20. Thus, the absolute position of the rack bar 30 can be derived by a difference between the rotation angles of the first and second steering motors 10 and 20.

The controller 100 may be configured to control an overall operation of the steering system. For example, the controller 100 controls the first and second steering motors 10 and 20 such that the controller 100 receives an angle of rotation generated in a steering wheel by operation of a driver, and then correspondingly generates a displacement of the rack bar 30.

Furthermore, the controller 100 performs an operation to derive a position of the rack bar 30 based on the rotation angles of the first and second steering motors 10 and 20 detected by the first and second motor position detectors 11 and 21.

Meanwhile, the steering system for a vehicle according to the exemplary embodiment of the present invention may further include a detector 13 for deriving the absolute position of the rack bar 30. The detector 13 is a pinion angle detector that detects an amount of rotation of the first pinion gear 12 engaged with the first rack gear portion 31 of the rack bar 30 and rotated by the first steering motor 10. In general, such a pinion angle detector is a detector that derives an absolute amount of rotation of the first pinion gear 12, that is, an amount of rotation beyond a 360 degree range.

The controller 100 determines whether the pinion angle detector 13 is defective by comparing a displacement of the rack bar 30 derived based on the difference between the rotation angles of the first and second steering motors 10 and 20 and a displacement of the rack bar 30 derived based on the absolute amount of rotation of the first pinion gear 12 detected by the pinion angle detector 13.

Figure 2:
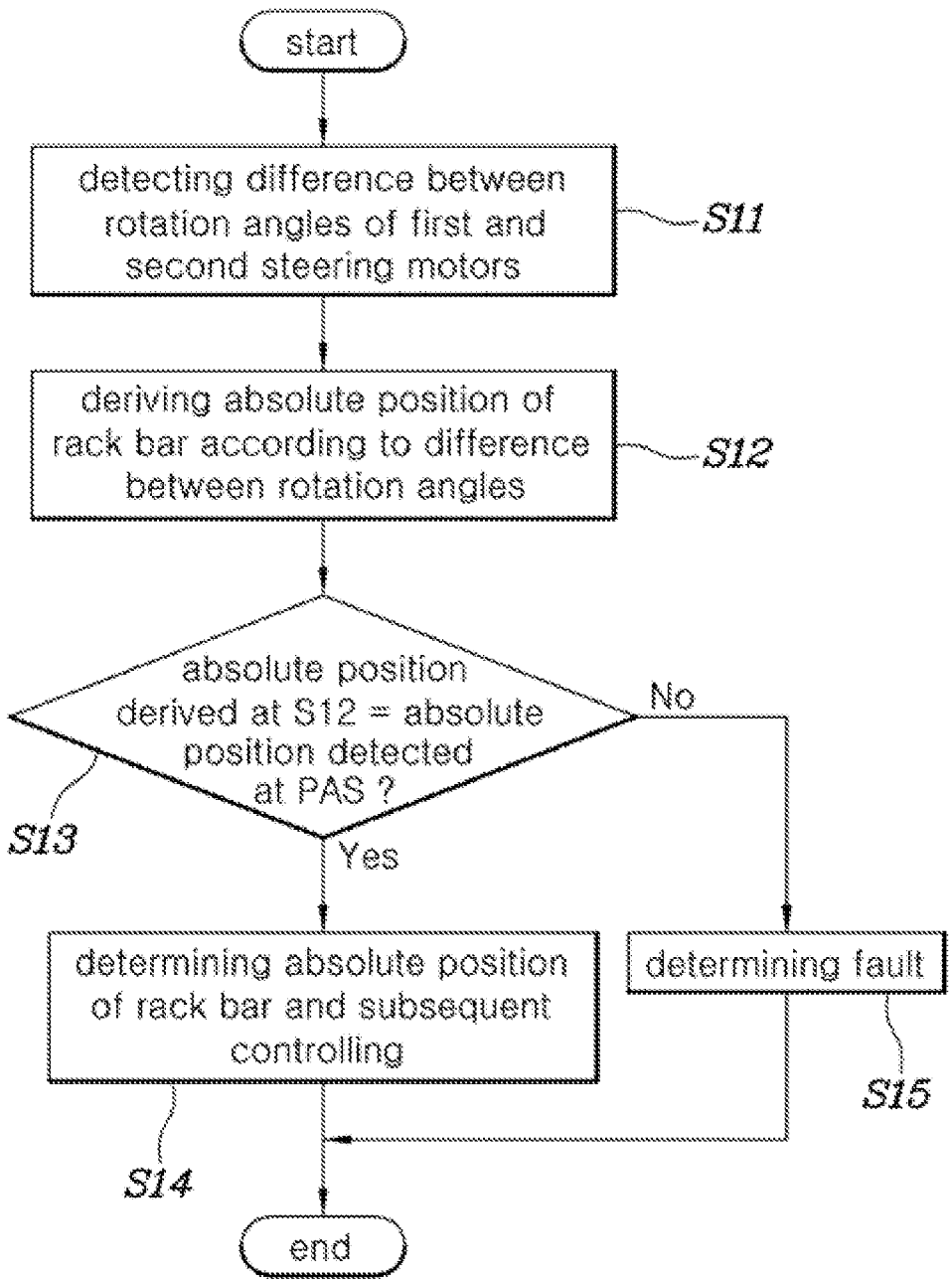
FIG. 2 is a flow chart showing a method of controlling a steering system for a vehicle according to an exemplary embodiment of the present invention.
Figure 3:
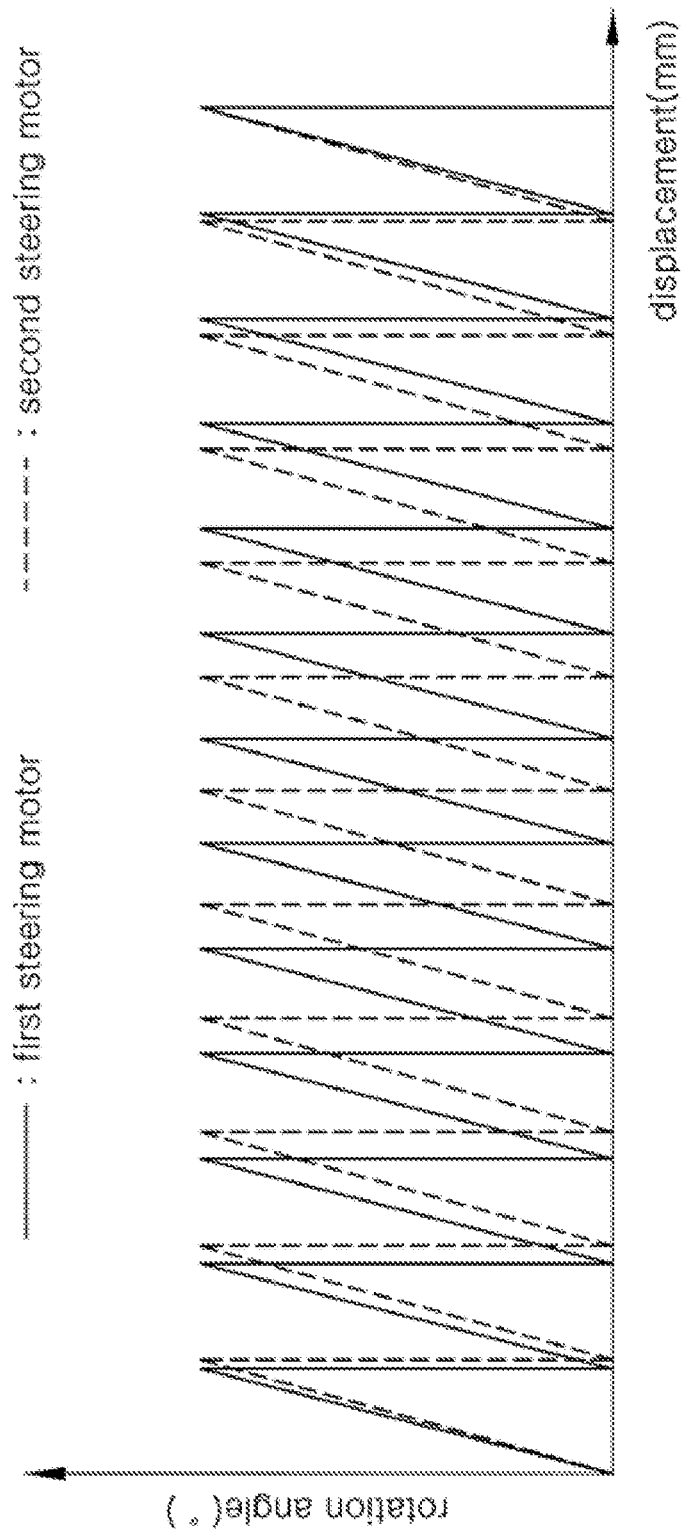
FIG. 3 is a graph showing relationship between a rotation angle of each of first and second steering motors and a displacement of a rack bar, the steering motors being used in the steering system for a vehicle and the method of controlling the same according to the exemplary embodiment of the present invention.

FIG. 2 is a flow chart showing a method of controlling a steering system for a vehicle according to an exemplary embodiment of the present invention, and FIG. 3 is a graph showing relationship between a rotation angle of first and second steering motors and a displacement of a rack bar, the steering motors being used in the steering system for a vehicle and the method of controlling the same according to the exemplary embodiment of the present invention.

The operation and effect of the steering system according to the exemplary embodiment of the present invention having the above-described configuration will be more clearly understood through the description of FIG. 2 and FIG. 3.

Referring to FIG. 2, first, the method of controlling the steering system for a vehicle according to the exemplary embodiment of the present invention performs a step of detecting by a first motor position detector 11 and a second motor position detector 21, respectively, rotation angles of a first steering motor 10 and a second steering motor 20 that are simultaneously connected to a rack bar 30 changing steering angles of wheels, and deriving by a controller 100 a difference between the rotation angles of the first and second steering motors 10 and 20 detected by the first and second motor position detectors 11 and 21, respectively, to provide a displacement to the rack bar 30 (S11).

As such, a step of deriving by the controller 100 an absolute position of the rack bar 30 based on the difference between the rotation angles of the first and second steering motors 10 and 20 detected by the first and second motor position detectors 11 and 21, respectively, is performed (S12).

As described above, the rotation angle detected by each of the first and second motor position detectors 11 and 21 is a relative rotation angle according to a position of a rotor of each of the first and second steering motors 10 and 20, the relative rotation angle being in a range of 0 to 360 degree angles without including an absolute amount of rotation of each of the first and second steering motors 10 and 20.

However, the steering system for a vehicle according to the exemplary embodiment of the present invention is configured such that an amount of displacement of the rack bar 30 according to an amount of rotation of the first steering motor 10 is determined differently than an amount of displacement of the rack bar 30 according to an amount of rotation of the second steering motor 20. Thus, the difference between the rotation angles detected by the first and second motor position detectors 11 and 21 may indicate a displacement of the rack bar 30. This will be more clearly understood with reference to FIG. 3.

As shown in FIG. 3, the rotation angle of the first steering motor 10 detected by the first motor position detector 11 is indicated by a solid line and the rotation angle of the second steering motor 20 detected by the second motor position detector 21 is indicated by a dotted line, and one cycle of each rotation angle can be understood to indicate that each of the first and second steering motors 10 and 20 made one revolution.

Referring to FIG. 3, since the amount of displacement of the rack bar 30 according to the amount of rotation of the first steering motor 10 is determined differently than the amount of displacement of the rack bar 30 according to the amount of rotation of the second steering motor 20, it can be confirmed that a displacement of the rack bar 30 according to the rotation angle of the first steering motor 10 is different from a displacement of the rack bar 30 according to the rotation angle of the second steering motor 20.

Moreover, the first and second steering motors 10 and 20 are simultaneously connected to one rack bar 30 and are operated such that torques of the first and second steering motors are simultaneously applied to the rack bar 30 to generate an equal amount of displacement of the rack bar 30. Thus, as shown in FIG. 3, it can be confirmed that there is a difference between the rotation angle of the first steering motor 10 and the rotation angle of the second steering motor 20 at a certain point indicating a displacement of the rack bar 30, and such a difference varies depending on a displacement. Thus, it is possible to derive an absolute displacement of the rack bar 30 through the difference between the rotation angles of the first and second steering motors 10 and 20.

The controller 100 derives the displacement of the rack bar 30 according to the difference between the rotation angles of the first and second steering motors 10 and 20 by previously storing a map data obtained by mapping a relationship between the displacement of the rack bar 30 and the difference between the rotation angles of the first and second steering motors 10 and 20 that are shown in FIG. 3.

As such, a step of comparing by the controller 100 a first absolute position value of the rack bar 30 derived from results of a pinion angle detector 13 detecting an absolute amount of rotation of a first pinion gear 12 engaged with a first rack gear portion 31 provided on the rack bar 30 and connected to a rotation shaft of the first steering motor 10, and a second absolute position value of the rack bar 30 derived based on the difference between the rotation angles of the first and second steering motors 10 and 20 is performed (S13).

As such, a step of determining by the controller 100 that the pinion angle detector 13 is not defective when the first absolute position value of the rack bar 30 derived from the results of the pinion angle detector 13 and the second absolute position value of the rack bar 30 derived based on the difference between the rotation angles of the first and second steering motors 10 and 20 are equal to each other, and determining by the controller 100 that the pinion angle detector 13 is defective when the first and second absolute position values are different from each other is performed (S14).

As described above, in the steering system for the vehicle and the method of controlling the same according to various embodiments of the present invention, even when only one pinion angle detector 13 detecting the absolute amount of rotation is used, it is possible to efficiently determine whether or not the pinion angle detector 13 is faulty. Thus, a structure of the steering system can be simplified and manufacturing cost thereof can be reduced without requiring a separate pinion angle detector.

In the steering system for the vehicle and the method of controlling the same according to various embodiments of the present invention, since only one pinion angle detector 13 detecting the absolute amount of rotation can be used, the second steering motor 20 that remains not connected to the pinion angle detector 13 may use a ball-screw mechanism instead of a rack-pinion mechanism.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering system for a vehicle, the system comprising:
first and second steering motors providing torque;
a rack bar to which a torque of the first steering motor and a torque of the second steering motor are simultaneously applied, and configured to change steering angles of wheels by being displaced by rotation of the first and second steering motors;
first and second motor position detectors detecting rotation angles of the first and second steering motors, respectively; and
a controller deriving an absolute position of the rack bar based on a difference between the rotation angles of the first and second steering motors detected by the first and second motor position detectors,
wherein an amount of displacement of the rack bar according to an amount of rotation of the first steering motor is different from an amount of displacement of the rack bar according to an amount of rotation of the second steering motor.

2. The system of claim 1, wherein each of the first and second motor position detectors detects a relative rotation angle of a rotation shaft of each of the first and second steering motors, the relative rotation angle being in a range of 0 to 360 degree angles.

3. The system of claim 2, wherein the controller derives revolutions of each of the first and second steering motors until a difference between relative rotation angles of the first and second steering motors occurs, and derives a displacement of the rack bar based on the revolutions and the relative rotation angle of the first steering motor or derives a displacement of the rack bar based on the revolutions and the relative rotation angle of the second steering motor.

4. The system of claim 1, further including:
first and second motion conversion mechanisms converting a rotation motion of the first steering motor and a rotation motion of the second steering motor into horizontal linear motions of the rack bar, respectively.

5. The system of claim 4, wherein the first motion conversion mechanism includes a first pinion gear connected to a rotation shaft of the first steering motor and a first rack gear portion provided on the rack bar and engaged with the first pinion gear, and further includes a pinion angle detector configured for detecting an absolute amount of rotation of the first pinion gear.

6. The system of claim 5, wherein the controller derives a displacement of the rack bar based on the absolute amount of rotation of the first pinion gear detected by the pinion angle detector, and determines whether the pinion angle detector is defective by comparing a displacement of the rack bar derived based on the difference between the rotation angles of the first and second steering motors and the displacement of the rack bar derived based on the absolute amount of rotation of the first pinion gear.

7. The system of claim 4, wherein the second motion conversion mechanism includes a second pinion gear connected to a rotation shaft of the second steering motor and a second rack gear portion provided on the rack bar and engaged with the second pinion gear, and
a gear ratio between the first pinion gear and the first rack gear portion is different from a gear ratio between the second pinion gear and the second rack gear portion.

8. The system of claim 5, wherein the second motion conversion mechanism is implemented as a ball-screw mechanism that converts a rotation motion of the second steering motor into the horizontal linear motion of the rack bar.

9. A method of controlling a steering system for a vehicle, the method comprising:
detecting a rotation angle of each of first and second steering motors that are simultaneously connected to a rack bar changing steering angles of wheels, and deriving a difference between the rotation angles of the first and second steering motors to provide a displacement to the rack bar;
deriving an absolute position of the rack bar based on the difference between the rotation angles of the first and second steering motors;
comparing a first absolute position value of the rack bar derived from results of a pinion angle detector configured for detecting an absolute amount of rotation of a first pinion gear engaged with a first rack gear portion provided on the rack bar and connected to a rotation shaft of the first steering motor, and a second absolute position value of the rack bar derived based on a difference between the rotation angles of the first and second steering motors; and
determining that the pinion angle detector is not defective when the first and second absolute position values are equal to each other, and determining that the pinion angle detector is defective when the first and second absolute position values are different from each other,
wherein an amount of displacement of the rack bar according to an amount of rotation of the first steering motor is different from an amount of displacement of the rack bar according to an amount of rotation of the second steering motor.

10. The method of claim 9, wherein the deriving of the difference between the rotation angles of the first and second steering motors is performed by detecting a relative rotation angle of the rotation shaft of the first steering motor and a rotation shaft of the second steering motor, the relative rotation angle being in a range of 0 to 360 degree angles, and deriving a difference between the relative rotation angles of the first and second steering motors.

11. The method of claim 10, wherein the deriving of the absolute position of the rack bar is performed by deriving revolutions of each of the first and second steering motors until the difference between the relative rotation angles of the first and second steering motors occurs, and deriving a displacement of the rack bar based on the revolutions and the relative rotation angle of the first steering motor or deriving a displacement of the rack bar based on the revolutions and the relative rotation angle of the second steering motor.

* * * * *